US012567963B2

(12) United States Patent
Wang

(10) Patent No.: US 12,567,963 B2
(45) Date of Patent: Mar. 3, 2026

(54) KEY MANAGEMENT METHOD AND APPARATUS

(71) Applicant: Beijing Sursen Information Technology Co., Ltd., Beijing (CN)

(72) Inventor: Donglin Wang, Beijing (CN)

(73) Assignee: Beijing Sursen Information Technology Co., Ltd., Beijing (CN)

( * ) Notice: Subject to any disclaimer, the term of this patent is extended or adjusted under 35 U.S.C. 154(b) by 488 days.

(21) Appl. No.: 18/175,872

(22) Filed: Feb. 28, 2023

(65) Prior Publication Data

US 2023/0208634 A1 Jun. 29, 2023

Related U.S. Application Data

(63) Continuation of application No. PCT/CN2021/115727, filed on Aug. 31, 2021.

(30) Foreign Application Priority Data

Aug. 31, 2020 (CN) .......................... 202010897527.4
Aug. 31, 2020 (CN) .......................... 202010897535.9

(51) Int. Cl.
*H04L 9/14* (2006.01)
*G06F 21/00* (2013.01)
(Continued)

(52) U.S. Cl.
CPC ................ *H04L 9/14* (2013.01); *G06F 21/00* (2013.01); *H04L 9/0822* (2013.01);
(Continued)

(58) Field of Classification Search
CPC ... H04L 9/0866; H04L 9/0822; H04L 9/0894; H04L 9/14; H04L 9/0825; H04L 2209/56;
(Continued)

(56) References Cited

U.S. PATENT DOCUMENTS 7,370,202 B2 * 5/2008 Appenzeller ........... H04L 9/083
726/19
12,105,817 B2 * 10/2024 Friel ................... H04L 63/0428
(Continued)

FOREIGN PATENT DOCUMENTS

CN 111090622 A * 5/2020 ........... H04L 63/105

*Primary Examiner* — Shaqueal D Wade-Wright
(74) *Attorney, Agent, or Firm* — Westbridge IP LLC

(57) ABSTRACT

Disclosed are a key management method and a key management apparatus, where the key management method includes: acquiring authorization of a user through a first identity authentication mode to generate a first authentication encryption key, where the first identity authentication mode is used for logging into a digital identity; and encrypting at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key. In the technical solutions of the present application, an identity authentication mode can be associated with a target key, facilitating a management and use process of the target key.

20 Claims, 5 Drawing Sheets

Acquiring authorization of a user through a first identity authentication mode to generate a first authentication encryption key, where the first identity authentication mode is used for logging into a digital identity —— S210

Encrypting at least one character decryption key by using the first authentication encryption key to obtain at least one initially encrypted character decryption key corresponding to the first identity authentication mode —— S220

(51) Int. Cl.
*H04L 9/08* (2006.01)
*H04L 9/32* (2006.01)
*H04L 9/40* (2022.01)

(52) U.S. Cl.
CPC .......... *H04L 9/0866* (2013.01); *H04L 9/0894* (2013.01); *H04L 9/088* (2013.01); *H04L 9/3226* (2013.01); *H04L 63/083* (2013.01)

(58) Field of Classification Search
CPC ..... H04L 9/088; H04L 9/3226; H04L 63/105; H04L 63/062; H04L 63/083; G06F 21/00
See application file for complete search history.

(56) References Cited

U.S. PATENT DOCUMENTS

2020/0313875 A1 * 10/2020 Feng .................... H04L 9/0866
2021/0406877 A1 * 12/2021 Wu .................... G06Q 20/4014

* cited by examiner

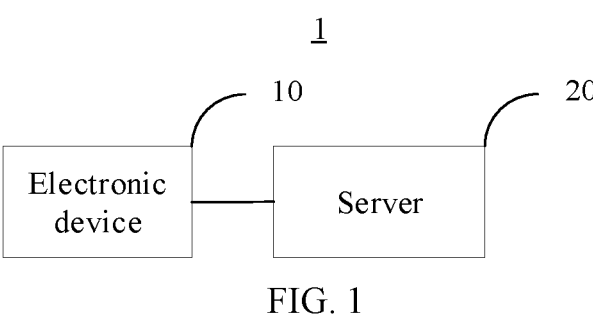

FIG. 1

Acquiring authorization of a user through a first identity authentication mode to generate a first authentication encryption key, where the first identity authentication mode is used for logging into a digital identity    S210

Encrypting at least one character decryption key by using the first authentication encryption key to obtain at least one initially encrypted character decryption key corresponding to the first identity authentication mode    S220

FIG. 2

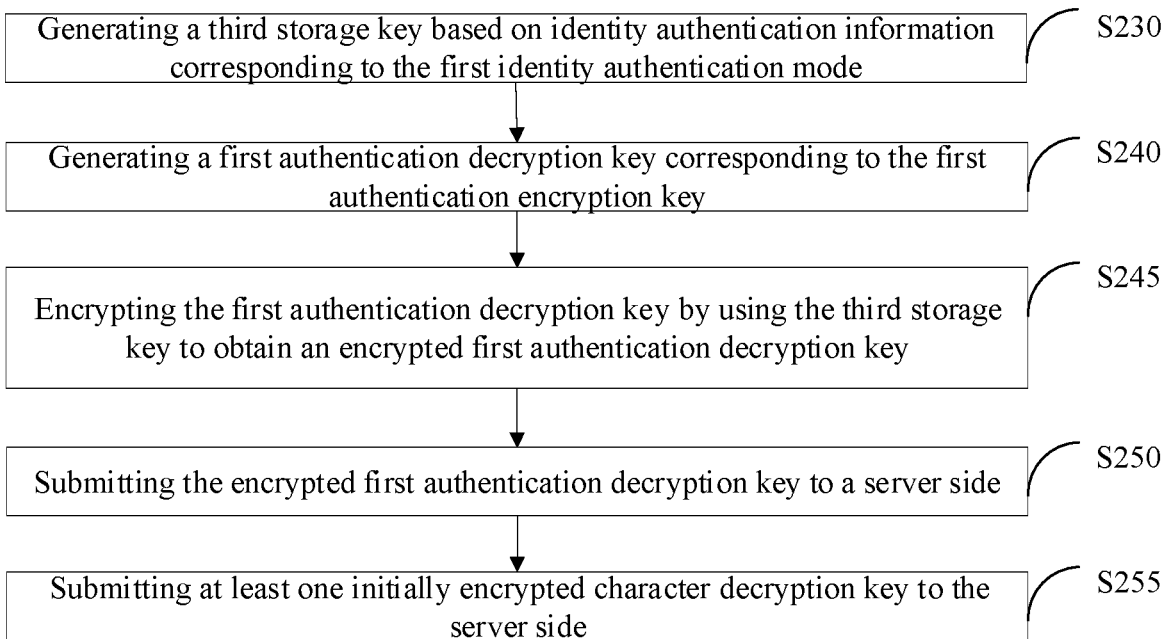

FIG. 3

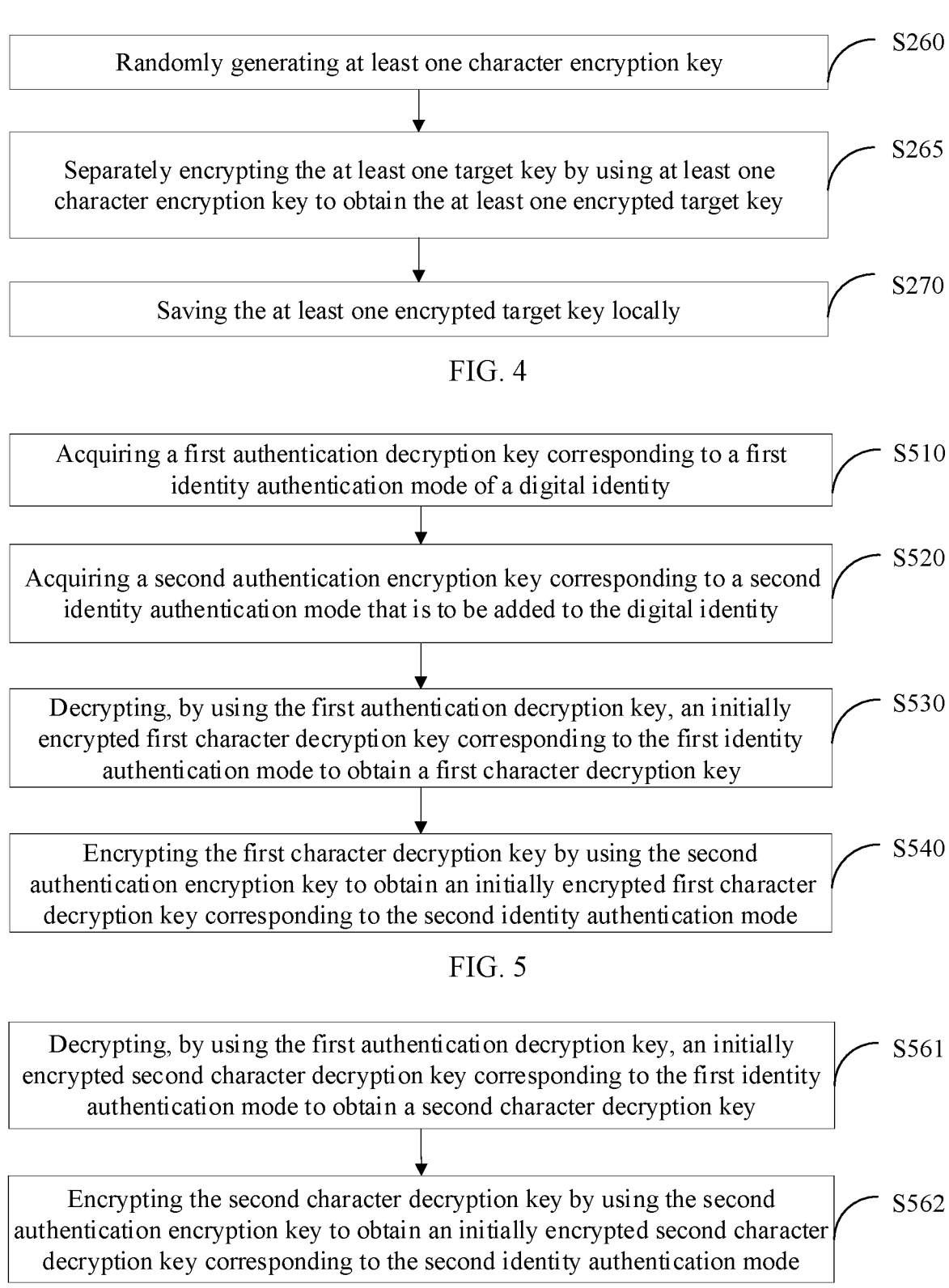

Randomly generating at least one character encryption key — S260

Separately encrypting the at least one target key by using at least one character encryption key to obtain the at least one encrypted target key — S265

Saving the at least one encrypted target key locally — S270

FIG. 4

Acquiring a first authentication decryption key corresponding to a first identity authentication mode of a digital identity — S510

Acquiring a second authentication encryption key corresponding to a second identity authentication mode that is to be added to the digital identity — S520

Decrypting, by using the first authentication decryption key, an initially encrypted first character decryption key corresponding to the first identity authentication mode to obtain a first character decryption key — S530

Encrypting the first character decryption key by using the second authentication encryption key to obtain an initially encrypted first character decryption key corresponding to the second identity authentication mode — S540

FIG. 5

Decrypting, by using the first authentication decryption key, an initially encrypted second character decryption key corresponding to the first identity authentication mode to obtain a second character decryption key — S561

Encrypting the second character decryption key by using the second authentication encryption key to obtain an initially encrypted second character decryption key corresponding to the second identity authentication mode — S562

FIG. 6

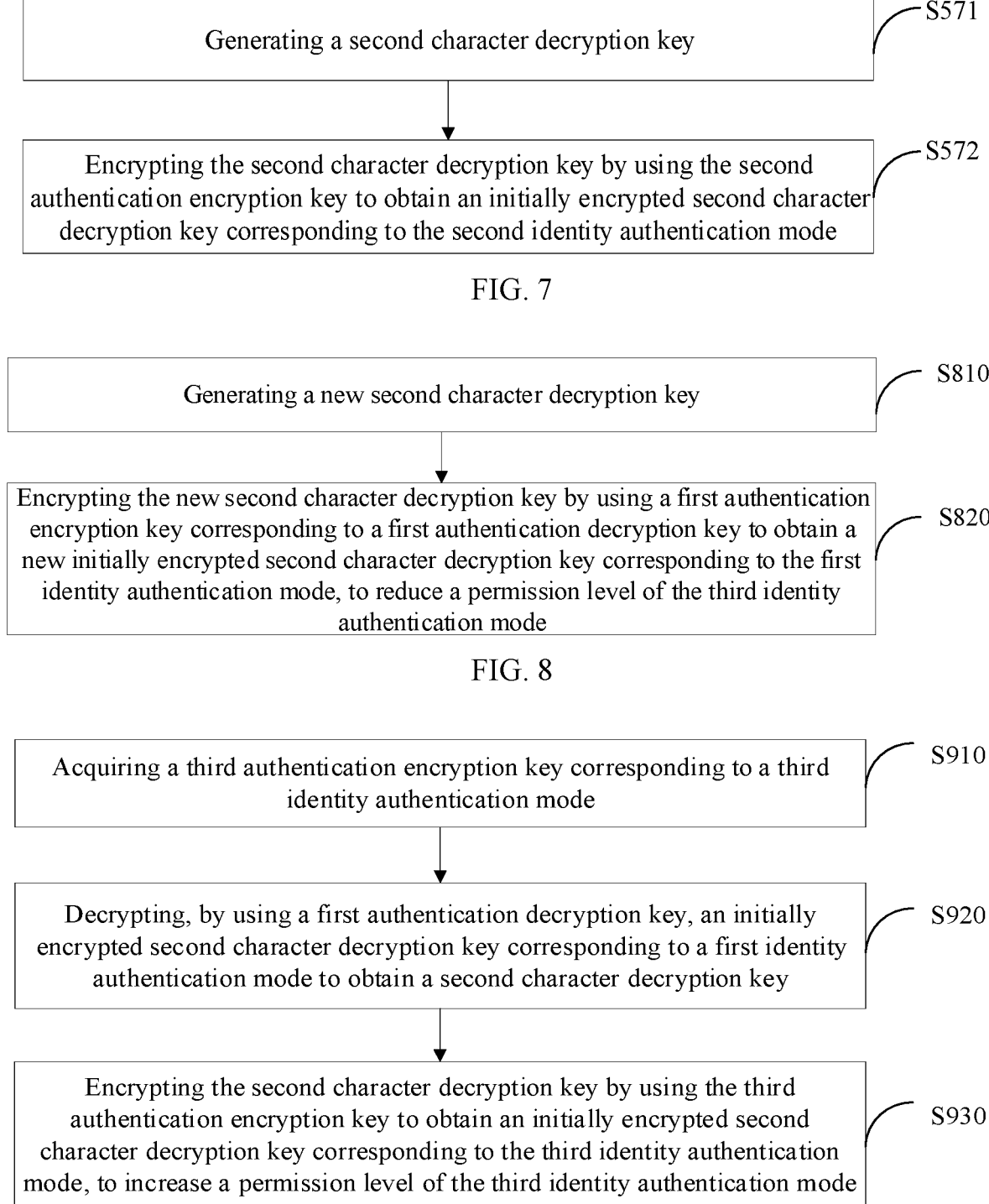

Generating a second character decryption key — S571

Encrypting the second character decryption key by using the second authentication encryption key to obtain an initially encrypted second character decryption key corresponding to the second identity authentication mode — S572

FIG. 7

Generating a new second character decryption key — S810

Encrypting the new second character decryption key by using a first authentication encryption key corresponding to a first authentication decryption key to obtain a new initially encrypted second character decryption key corresponding to the first identity authentication mode, to reduce a permission level of the third identity authentication mode — S820

FIG. 8

Acquiring a third authentication encryption key corresponding to a third identity authentication mode — S910

Decrypting, by using a first authentication decryption key, an initially encrypted second character decryption key corresponding to a first identity authentication mode to obtain a second character decryption key — S920

Encrypting the second character decryption key by using the third authentication encryption key to obtain an initially encrypted second character decryption key corresponding to the third identity authentication mode, to increase a permission level of the third identity authentication mode — S930

KEY MANAGEMENT METHOD AND APPARATUS

CROSS-REFERENCE TO RELATED APPLICATIONS

The present application is a continuation application of International Application No. PCT/CN2021/115727, filed on Aug. 31, 2021, which claims priority to Chinese Patent Application No. 202010897527.4, filed on Aug. 31, 2020, and Chinese Patent Application No. 202010897535.9, filed on Aug. 31, 2020. All of the aforementioned patent applications are incorporated herein by reference in their entireties.

TECHNICAL FIELD

The present application relates to the field of encryption technologies, and in particular, to a key management method and a key management apparatus.

BACKGROUND

With the growth of blockchain technologies, more and more investors are coming into contact with digital currency. However, it is often very difficult to remember a key used to manage digital currency due to its large number of digits and irregularity, which hinders popularization of the digital currency. To allow users to keep a key more conveniently and securely, some solutions have emerged on the market in recent years. However, there has never been a solution that can truly relieve users' pressure on key management.

Meanwhile, the Internet of Things is developing at a high speed, and more and more products in daily life are beginning to implement intelligent management. However, various smart products make users need to manage a large number of scattered accounts, which makes users feel inconvenient. If mismanagement occurs, users' assets even have security risks.

SUMMARY

In view of this, to resolve the foregoing problems faced by a user in asset management in the conventional technology, embodiments of the present application provide a key management method and a key management apparatus.

According to a first aspect of the embodiments of the present application, a key management method is provided and includes: acquiring authorization of a user through a first identity authentication mode to generate a first authentication encryption key, where the first identity authentication mode is used for logging into a digital identity; and encrypting at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key.

According to a second aspect of the embodiments of the present application, a key management method is provided and includes: acquiring a first authentication decryption key corresponding to a first identity authentication mode of a digital identity; acquiring a second authentication encryption key corresponding to a second identity authentication mode that is to be added to the digital identity; decrypting, by using the first authentication decryption key, an initially encrypted first character decryption key corresponding to the first identity authentication mode to obtain a first character decryption key; and encrypting the first character decryption key by using the second authentication encryption key to obtain an initially encrypted first character decryption key corresponding to the second identity authentication mode, where the first character decryption key is corresponding to a first character in at least one character of the digital identity and used to decrypt an encrypted first target key to obtain a first target key.

According to a third aspect of the embodiments of the present application, a key management apparatus is provided and includes: a first acquisition module, configured to acquire authorization of a user through a first identity authentication mode to generate a first authentication encryption key, where the first identity authentication mode is used for logging into a digital identity; and a first encryption module, configured to encrypt at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key.

According to a fourth aspect of the embodiments of the present application, a key management apparatus is provided and includes: a first acquisition module, configured to acquire a first authentication decryption key corresponding to a first identity authentication mode of a digital identity; a second acquisition module, configured to acquire a second authentication encryption key corresponding to a second identity authentication mode that is to be added to the digital identity; a first decryption module, configured to decrypt, by using the first authentication decryption key, an initially encrypted first character decryption key corresponding to the first identity authentication mode to obtain a first character decryption key; and a first encryption module, configured to encrypt the first character decryption key by using the second authentication encryption key to obtain an initially encrypted first character decryption key corresponding to the second identity authentication mode, where the first character decryption key is corresponding to a first character in at least one character of the digital identity and used to decrypt an encrypted first target key to obtain a first target key.

According to a fifth aspect of the embodiments of the present application, an electronic device is provided and includes: a process; and a memory, where the memory is configured to store instructions executable by the processor, and the instructions, when executed by the processor, cause the processor to perform the key management method according to the first aspect or the second aspect.

According to a sixth aspect of the embodiments of the present application, a computer-readable storage medium is provided and includes computer instructions stored thereon, and the computer instructions, when executed by a processor, cause the processor to perform the key management method according to the first aspect or the second aspect.

According to the key management method and the key management apparatus provided in the embodiments of the present application, a first authentication encryption key corresponding to a first identity authentication mode is generated, and at least one character decryption key of a digital identity is encrypted by using the first authentication encryption key, where the at least one character decryption key is used to decrypt an encrypted target key to obtain at least one target key, so that an identity authentication mode can be associated with a target key, facilitating a management and use process of the target key.

BRIEF DESCRIPTION OF THE DRAWINGS

FIG. 1 is a schematic diagram of a system architecture of a key management system according to an exemplary embodiment of the present application.

FIG. 2 is a schematic flowchart of a key management method according to an exemplary embodiment of the present application.

FIG. 3 is a schematic flowchart of a key management method according to another exemplary embodiment of the present application.

FIG. 4 is a schematic flowchart of a key management method according to another exemplary embodiment of the present application.

FIG. 5 is a schematic flowchart of a key management method according to another exemplary embodiment of the present application.

FIG. 6 is a schematic flowchart of a key management method according to another exemplary embodiment of the present application.

FIG. 7 is a schematic flowchart of a key management method according to another exemplary embodiment of the present application.

FIG. 8 is a schematic flowchart of a key management method according to another exemplary embodiment of the present application.

FIG. 9 is a schematic flowchart of a key management method according to another exemplary embodiment of the present application.

DETAILED DESCRIPTION OF THE EMBODIMENTS

Figure 10:
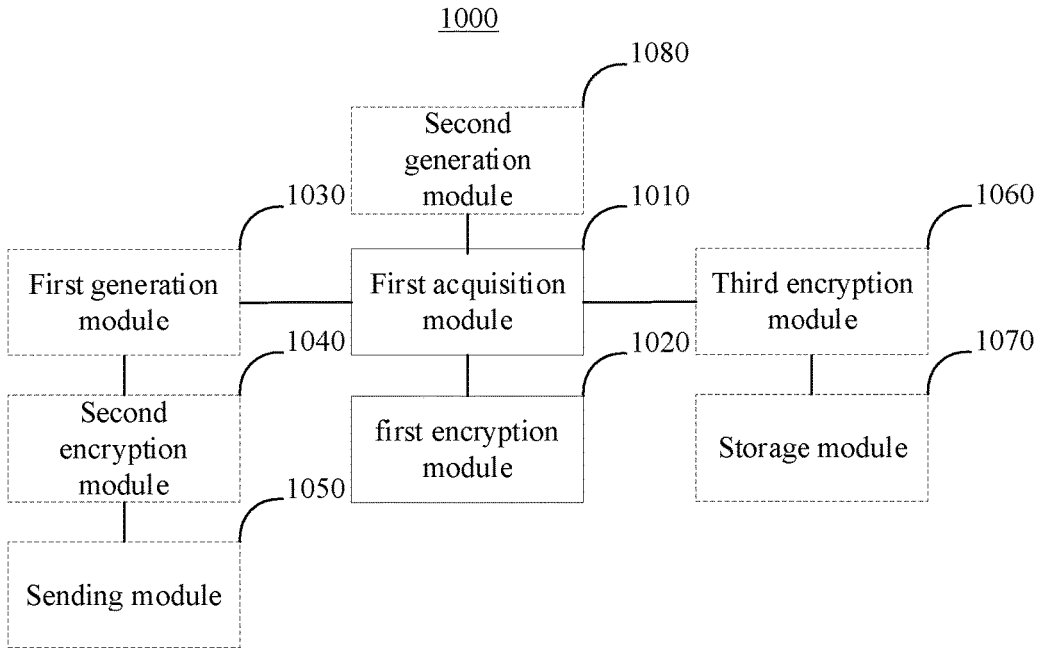
FIG. 10 is a schematic structural diagram of a key management apparatus according to an exemplary embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Overview

In the conventional technology, a key is an identity authentication mode for a machine, not for a human being. The key may be used to manage a digital currency, and may also be used to perform a specific intelligent operation (for example, a switch of an intelligent door lock), which may be set according to a requirement of a user. However, there are various problems in use of existing keys. For example, to improve security, a length of a key is designed to be very long, which causes a user to easily forget the key; for different digital currencies or intelligent operations, there may be a plurality of different keys, causing a user to easily confuse various keys; and a key is easy to be stolen during use. These problems cause a key to be in low overall security and poor convenience during use.

Exemplary System

FIG. 1 is a schematic diagram of a system architecture of a key management system according to an exemplary embodiment of the present application, which shows an application scenario in which key management is performed by an electronic device. As shown in FIG. 1, the key management system 1 includes an electronic device 10 and a server 20. The electronic device 10 may acquire authorization of a user through a first identity authentication mode to generate a first authentication encryption key and a first authentication decryption key, encrypt a character key (a character decryption key) based on the first authentication encryption key, and save an encrypted character key to the server 20, to implement a creation process of a digital identity or an addition process of the first identity authentication mode of the digital identity. Further, the electronic device 10 may implement a process of managing or using the character key by acquiring the encrypted character key from the server 20 and decrypting the encrypted character key. The character key may include a character decryption key and a character encryption key.

In another embodiment, the electronic device 10 may acquire authorization of a user through a first identity authentication mode to generate a first authentication encryption key and a first authentication decryption key, encrypt a character key based on the first authentication encryption key, and save an encrypted character key to the electronic device 10, to implement a creation process of a digital identity or an addition process of the first identity authentication mode of the digital identity. Further, the electronic device 10 may implement a process of managing or using the character key by decrypting the encrypted character key.

The electronic device 10 herein may be a mobile device such as a mobile phone, a game console, a tablet computer, a camera, a video camera, or a vehicle-mounted computer; or may be a computer, such as a notebook computer, or a desktop computer; or may be another electronic device including a processor and a memory. When the electronic device 10 is from the foregoing various possible options, the first identity authentication mode may be a mode of authenticating an identity of a user through one piece of existing information of the user. The existing information may be a third-party platform account held by the user, for example, an account corresponding to an application program installed by the user on the electronic device 10.

It should be noted that, the foregoing application scenario is merely illustrated to facilitate understanding the spirit and principles of the present application, and the embodiments of the present application are not limited thereto. On the contrary, the embodiments of the present application may be applied to any scenario that may be applicable.

Exemplary Methods

FIG. 2 is schematic flowchart of a key management method according to an exemplary embodiment of the present application. The method illustrated in FIG. 2 may be performed by an electronic device, for example, a mobile phone, and may be specifically performed by a client corresponding to a digital identity on the electronic device. As shown in FIG. 2, the key management method relates to a creation process of a digital identity or an addition process of the first identity authentication mode (a first identity authentication mode) of the digital identity, and specifically includes the following contents.

S210: acquiring authorization of a user in the first identity authentication mode to generate a first authentication encryption key, where the first identity authentication mode is used for logging into a digital identity.

The user may implement a creation process of the digital identity through the first identity authentication mode; or the digital identity is created in advance, and the user may add the first identity authentication mode to the digital identity.

In an embodiment, the digital identity may be created in advance, which is an empty digital identity. In a process of adding the first identity authentication mode to the digital identity, at least one character may be set for the digital identity. Each character corresponds to different permissions and is used to manage or use different digital currencies, or perform different intelligent operations.

In an embodiment, a plurality of characters are created for the digital identity through the first identity authentication mode. When the digital identity is created, the user may log into the digital identity through the first identity authentication mode, and use a permission corresponding to any character to perform a corresponding operation.

Further, the user may further add another identity authentication mode to the digital identity through the first identity authentication mode. Any identity authentication mode may be used to log into the digital identity, and different identity authentication modes may use permissions corresponding to different characters.

An identity authentication mode may be a mode of authenticating an identity of the user through one piece of existing information of the user. The existing information of the user herein may include a third-party platform account, an identity authentication chip and a terminal system account that are held by the user, a human biological feature of the user, and the like. The third-party platform account may be a social platform account, a shopping platform account, a financial platform account, a mobile phone number account, a network service account, an intelligent Internet of Things platform account or the like held by the user, for example, a WeChat account, a Microsoft account, a Taobao account, or a mobile banking account. It should be understood that, a specific type of existing information of a user is not limited in the embodiments of the present application.

It should be understood that, the term "user" used in the present application is not limited to a natural person, but may also include, for example, a machine, a monkey, a virtual identity, and an organization. A real identity of the user is not limited in the present application.

In an embodiment, the electronic device may generate, based on the first identity authentication mode, a first authentication decryption key and a first authentication encryption key that are corresponding to the first identity authentication mode. An authentication decryption key and an authentication encryption key may be used to verify an identity authentication mode, so that the user may use a permission corresponding to the identity authentication mode.

The authentication decryption key and the authentication encryption key may be symmetric keys or asymmetric keys. The authentication encryption key may be an authentication public key, and the authentication decryption key may be an authentication private key.

When the authentication decryption key and the authentication encryption key are symmetric keys, they are the same. When the authentication decryption key and the authentication encryption key are asymmetric keys, they are different.

The first authentication decryption key may be saved locally (in the electronic device) or at a server side.

S220: encrypting at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key.

In an embodiment, the at least one target key is separately used to manage an asset corresponding to the at least one character. When a plurality of characters are created for the digital identity through the first identity authentication mode, a corresponding character decryption key is generated for each character. Each character decryption key may be corresponding to one or more target keys and used to decrypt the encrypted target key decrypt to obtain a corresponding target key.

Specifically, the character decryption key may be randomly generated by the electronic device. Herein when a plurality of characters are created for the digital identity through the first identity authentication mode, a corresponding character encryption key may further be generated for each character. Similar to authentication keys (the authentication decryption key and the authentication encryption key), the character decryption key and the character encryption key may be symmetric keys or asymmetric keys.

In another embodiment, the character decryption key may be generated on the server side.

Specifically, the digital identity may have at least one asset, such as a digital currency account, and accounts of various login modes. Each asset has an associated target key and is used to manage the corresponding asset. The encrypted target key may be saved on the server side or locally.

When a digital identity has only one character, namely, a first character, the first character may have management permission for all assets held by the digital identity. When a digital identity includes a plurality of characters, different characters in the plurality of characters may separately have management permission for different assets in the assets held by the digital identity. For example, a digital identity may include a first character and a second character, where the first character has permission to manage a WeChat account, a Weibo account, and a bus card, and the second character has permission to manage a smart door lock and a digital currency account.

Further, when management permission for at least one asset is granted to a character, a character encryption key corresponding to the character may be used to separately encrypt at least one target key corresponding to at least one asset that is within the management permission, to obtain at least one encrypted target key, and save the at least one encrypted target key to the digital identity. For example, a first character encryption key is used to encrypt a target key of an asset corresponding to the first character, to obtain an encrypted target key. In this way, when the electronic device obtains a character decryption key, the character decryption key may be used to decrypt the encrypted target key, to obtain the target key.

Preferably, in another embodiment, after obtaining the target key, the electronic device may further implement, by using the target key and according to an instruction from a user, management of an asset corresponding to the target key. For example, when the target key is a key of a digital currency account, the user may issue an operation instruction to check balance of the digital currency account. After receiving the operation instruction, the electronic device may find a corresponding encrypted target key, and use a first character decryption key to decrypt the encrypted target key, to obtain the target key and execute the operation instruction issued by the user.

According to the key management method provided in the embodiments of the present application, a first authentication encryption key corresponding to a first identity authentication mode is generated, and at least one character decryption key of a digital identity is encrypted by using the first authentication encryption key, where the at least one character decryption key is used to decrypt an encrypted target key to obtain at least one target key, so that an identity authentication mode can be associated with a target key, facilitating a management and use process of the target key.

FIG. 3 is schematic flowchart of a key management method according to another exemplary embodiment of the present application. The embodiment illustrated in FIG. 3 of the present application is further obtained based on the embodiment illustrated in FIG. 2 of the present application. The following focuses on the differences between the embodiment illustrated in FIG. 3 and the embodiment illustrated in FIG. 2, and the similarities are not repeated.

As shown in FIG. 3, on the basis of the embodiment illustrated in FIG. 2, the key management method provided in the embodiment of the present application further includes the following contents.

S230: generating a third storage key based on identity authentication information corresponding to the first identity authentication mode.

S240: generating a first authentication decryption key corresponding to the first authentication encryption key.

S245: encrypting the first authentication decryption key by using the third storage key to obtain an encrypted first authentication decryption key.

In this embodiment, the first authentication decryption key is encrypted, so that security of an acquisition process of the first authentication decryption key may be guaranteed, which may improve security of an overall management and use process of a target key. The encrypted first authentication decryption key may be saved locally. Herein the third storage key may be used to encrypt the first authentication decryption key. The third storage key may be a symmetric key or an asymmetric key.

In an embodiment, the identity authentication information is non-public identity authentication information, and the third storage key may be generated based on the non-public identity authentication information and a user's parent name corresponding to the first identity authentication mode. For example, the non-public identity authentication information is a WeChat ID. A core employee in Tencent may know the WeChat ID, and a relative or a friend of the user may know the parent name, but the two basically do not overlap, so that key management security may be improved, effectively preventing a key from being stolen.

In an embodiment, as shown in FIG. 3, the key management method further includes the following contents.

S250: submitting the encrypted first authentication decryption key to a server side.

Specifically, the encrypted first authentication decryption key may be saved in a key database on the server side.

S255: submitting at least one initially encrypted character decryption key to the server side.

Specifically, at least one initially encrypted character decryption key may be saved in a user database on the server side.

To reduce a risk of disclosure of the third storage key, the electronic device may generate a third storage key based on the first identity authentication mode, or may associate a generated third storage key with the first identity authentication mode for storage, so that the electronic device can acquire the third storage key only when a user logs into the digital identity through the first identity authentication mode. For example, the electronic device may calculate the third storage key based on first identity authentication information, or the electronic device may randomly generate the third storage key and store the third storage key on a cloud corresponding to the first identity authentication mode.

Specifically, when creating the first identity authentication mode, the electronic device may send an account creation request to the server side, so that the server side creates a first key database account for logging into the key database. The first key database account is corresponding to the first identity authentication mode and used to store the encrypted first authentication decryption key. Herein the first key database account may have a pair of account number and password, namely, a first login account number and a first login password, and the electronic device may log into the key database according to the first login account number and the first login password and obtain data from the key database. It should be understood that, the first login account number and the first login password may be generated by the electronic device and sent to the server side, or may be directly generated on the server side, which is not limited in the embodiments of the present application.

The electronic device may calculate the first login account number and the first login password based on the first identity authentication mode, or may obtain the pre-stored first login account number and the first login password by logging into the cloud corresponding to the first identity authentication mode, or may directly obtain the first login account number and the first login password locally that are associated with the first identity authentication mode.

It should be understood that, a specific method of generating and storing the first login account number and the first login password is not limited in the embodiments of the present application.

Further, the initially encrypted character decryption key is saved in the user database on the server side, and a connection between the user database and the key database may only be clear on an electronic device side, but not on a background server side. In this way, when the user database is accessed to acquire the initially encrypted character decryption key, a background server-side staff does not know a specific user corresponding to the initially encrypted character decryption key to be accessed, so that security of a key acquisition process may be further improved.

Step S255 may be performed in any step between Step S220 and Step S250, which is not limited in the embodiments of the present application.

Optionally, one or more of the encrypted first authentication decryption key and the initially encrypted character decryption key are saved locally, which may be semi-dependent or independent of a key management process on the server side.

FIG. 4 is schematic flowchart of a key management method according to another exemplary embodiment of the present application. The embodiment illustrated in FIG. 4 of the present application is further obtained based on the embodiment illustrated in FIG. 2 of the present application.

The following focuses on the differences between the embodiment illustrated in FIG. 4 and the embodiment illustrated in FIG. 2, and the similarities are not repeated.

As shown in FIG. 4, on the basis of the embodiment illustrated in FIG. 2, the key management method provided in the embodiment of the present application further includes the following contents.

S260: randomly generating at least one character encryption key.

S265: separately encrypting the at least one target key by using at least one character encryption key to obtain the at least one encrypted target key.

S270: saving the at least one encrypted target key locally.

Specifically, the electronic device may set a plurality of characters for the digital identity through the first identity authentication mode, and generate a corresponding character encryption key for each character. The character encryption key may be generated randomly, or may be generated based on specific information or a specific algorithm. A generation process of the character encryption key may be set as required, which is not limited in the embodiments of the present application.

The target key may be preset, and the target key encrypted by the character encryption key may be saved locally.

In the embodiment, in Step S260, both a character encryption key and a character decryption key may be generated, and both can be asymmetric keys. In another embodiment, the character encryption key and the character decryption key may be generated on the server side, and the encrypted target key may also be saved on the server side.

Step S260 may be performed before or after Step S220, or may be performed simultaneously with Step S220, which is not limited in the embodiments of the present application.

According to an embodiment of the present application, the at least one character includes a first character and a second character, the digital identity includes a first permission level and a second permission level, and the first permission level is lower than the second permission level. The first permission level has permission to manage an asset corresponding to the first character, the second permission level has permission to manage assets corresponding to the first character and the second character, and the first identity authentication mode corresponds to the first permission level. The encrypting at least one character decryption key by using the first authentication encryption key to obtain at least one initially encrypted character decryption key corresponding to the first identity authentication mode (S220) includes: encrypting a first character decryption key corresponding to the first character and a second character decryption key corresponding to the second character by using the first authentication encryption key to obtain an initially encrypted first character decryption key and an initially encrypted second character decryption key that are corresponding to the first identity authentication mode, so as to add a second identity authentication mode with a second permission level through the first identity authentication mode.

In the embodiment, the first identity authentication mode is the first identity authentication mode of the digital identity, and another identity authentication mode may be added for the digital identity through the first identity authentication mode. That is, after an addition process, the digital identity may correspond to a plurality of identity authentication modes, and the plurality of identity authentication modes may correspond to a same user or different users.

The digital identity may include a plurality of permission levels, and each permission level in the plurality of permission levels has permission to manage an asset corresponding to at least one character in the plurality of characters.

Specifically, a digital identity may divide all corresponding identity authentication modes according to a permission level, so that each identity authentication mode has its own permission level, and then the identity authentication mode has asset management permission of at least one character corresponding to the corresponding permission level.

For example, the first identity authentication mode may correspond to the first permission level in the plurality of permission levels, the first permission level may have permission to manage the asset corresponding to the first character, and then a user logging into the digital identity through the first identity authentication mode can manage the asset corresponding to the first character; and the second identity authentication mode may correspond to the second permission level in the plurality of permission levels, the second permission level may have permission to manage the asset corresponding to the first character and an asset corresponding to the second character, and then a user logging into the digital identity through the second identity authentication mode can manage both the asset corresponding to the first character and the asset corresponding to the second character.

In practical applications, each identity authentication mode may have a corresponding authentication encryption key and a corresponding authentication decryption key, for example, the first identity authentication mode may correspond to the first authentication encryption key and the first authentication decryption key. When the first permission level is granted to the first identity authentication mode, the first authentication encryption key may be used to encrypt the first character decryption key corresponding to the first permission level, to obtain the initially encrypted first character decryption key. In this way, when a user logs into the digital identity through the first identity authentication mode, the electronic device may obtain the first authentication decryption key, find the initially encrypted first character decryption key, and decrypt the initially encrypted first character decryption key by using the first authentication decryption key, to obtain the first character decryption key. For another example, when the second permission level is granted to the second identity authentication mode, the second authentication encryption key may be used to separately encrypt the first character decryption key and the second character decryption key that are corresponding to the second permission level, to obtain an initially encrypted first character decryption key and the initially encrypted second character decryption key. Similarly, when a user logs into the digital identity through the second identity authentication mode, the electronic device may acquire the second authentication decryption key, find the initially encrypted first character decryption key and/or the initially encrypted second character decryption key according to the user's needs, and use the second authentication decryption key to decrypt the initially encrypted first character decryption key and/or the initially encrypted second character decryption key, to obtain the first character decryption key and/or the second character decryption key.

It should be understood that, a specific division and corresponding modes of assets, characters, and permission levels may be set by those skilled in the art according to actual needs, or may be customized in the system by a user, which is not limited in the embodiments of the present application.

In the embodiment, since the first identity authentication mode is the first identity authentication mode of the digital identity, another subsequent identity authentication mode can be added through the first identity authentication mode. Specifically, when the second identity authentication mode with the second permission level is added to the digital identity, to improve security of a key management process, the first identity authentication mode is required to be used to log into the digital identity to acquire the first character decryption key and the second character decryption key, and the second authentication encryption key corresponding to the second identity authentication mode is used to encrypt the first character decryption key and the second character decryption key, to obtain the initially encrypted first character decryption key and the initially encrypted second character decryption key that are corresponding to the second identity authentication mode.

In an embodiment, the permission level of each identity authentication mode may be granted by a user, or may be determined by an attribute of the identity authentication mode. For example, a permission level of an identity authentication mode "fingerprint" is higher than that of an identity authentication mode "WeChat".

In an embodiment, since the first identity authentication mode is the first identity authentication mode of the digital identity, to facilitate addition of the second identity authentication mode with a permission level higher than that of the first identity authentication mode, the first identity authentication mode of the digital identity may have the highest permission level (for example, the second permission level). Alternatively, the first identity authentication mode of the digital identity has a low permission level (for example, the first permission level), but temporarily has permission to acquire all character decryption keys. After the second identity authentication mode having the second permission level is added, the first identity authentication mode reverts to the first permission level.

A process of adding the second identity authentication mode for the digital identity through the first identity authentication mode is described in detail below.

FIG. 5 is a schematic flowchart of a key management method according to another exemplary embodiment of the present application. The method illustrated in FIG. 5 may be performed by an electronic device, such as a mobile phone, and specifically may be performed by a client, on the electronic device, corresponding to a digital identity. As shown in FIG. 5, the key management method relates to a process of adding a second identity authentication mode for the digital identity through a first identity authentication mode, and specifically includes the following contents.

S510: acquiring a first authentication decryption key corresponding to a first identity authentication mode of a digital identity.

Specifically, a user may log into the digital identity through the first identity authentication mode.

In an embodiment, the first authentication decryption key may be obtained directly from a local or a server side. In another embodiment, an encrypted first authentication decryption key may be obtained directly from a local or a server side and decrypted by using a third storage key to obtain the first authentication decryption key.

S520: acquiring a second authentication encryption key corresponding to a second identity authentication mode that is to be added to the digital identity.

In an embodiment, the second authentication decryption key may also be generated during generation of the second authentication encryption key. For a generation process of the second authentication encryption key and the second authentication decryption key, reference may be made to the generation process of the first authentication encryption key and the first authentication decryption key, that is, reference may be made to the foregoing description of the embodiment illustrated in FIG. 2. To avoid repetition, details are not repeated herein again.

When the second identity authentication mode and the first identity authentication mode correspond to a same user, the second identity authentication mode and the first identity authentication mode may correspond to a same electronic device. In this case, an acquisition process of the second authentication encryption key and the second authentication decryption key may be directly generated on the electronic device side.

When the second identity authentication mode and the first identity authentication mode correspond to different users, the second identity authentication mode and the first identity authentication mode correspond to different electronic devices. In this case, the acquisition process of the second authentication encryption key and the second authentication decryption key may be as follows: the electronic device corresponding to the first identity authentication mode receives the second authentication encryption key and the second authentication decryption key sent by the electronic device corresponding to the second identity authentication mode, and the second authentication encryption key and the second authentication decryption key are generated on the electronic device side corresponding to the second identity authentication mode.

S530: decrypting, by using the first authentication decryption key, an initially encrypted first character decryption key corresponding to the first identity authentication mode to obtain a first character decryption key.

Specifically, the digital identity may correspond to at least one character, and each character corresponds to one character decryption key. According to preset management permission of the second identity authentication mode, a corresponding character decryption key is acquired by using the first authentication decryption key. The preset management permission herein may be set according to willingness of a user. When the at least one character is a plurality of characters, the user may preset the second identity authentication mode to have permission to manage an asset corresponding to any one of or several characters in the plurality of characters.

S540: encrypting the first character decryption key by using the second authentication encryption key to obtain an initially encrypted first character decryption key corresponding to the second identity authentication mode.

The first character decryption key is corresponding to a first character in at least one character of the digital identity and used to decrypt an encrypted first target key to obtain a first target key.

In an embodiment, the second authentication decryption key is used to decrypt the initially encrypted first character decryption key corresponding to the second identity authentication mode, to obtain the first character decryption key. The first target key is used to manage an asset corresponding to the first character.

When the second identity authentication mode and the first identity authentication mode correspond to a same user, the second identity authentication mode and the first identity authentication mode may correspond to a same electronic device. In this case, the electronic device may save the initially encrypted first character decryption key corresponding to the second identity authentication mode to a server side and/or a client corresponding to the second identity authentication mode.

When the second identity authentication mode and the first identity authentication mode correspond to different users, the second identity authentication mode and the first identity authentication mode correspond to different electronic devices. In this case, the electronic device corresponding to the first identity authentication mode may send the initially encrypted first character decryption key corresponding to the second identity authentication mode to the electronic device and/or the server side corresponding to the second identity authentication mode.

According to the key management method provided in the embodiments of the present application, the second identity authentication mode is added for the digital identity through the first identity authentication mode, so that classified management of keys may be implemented, and diversity of a key management process may be implemented.

According to an embodiment of the present application, the first identity authentication mode corresponds to a first permission level in a plurality of permission levels of the digital identity, the second identity authentication mode corresponds to a second permission level in the plurality of permission levels, and the first permission level has permission to manage an asset corresponding to the first character. Before the decrypting, by using the first authentication decryption key, an initially encrypted first character decryption key corresponding to the first identity authentication mode, the key management method further includes: determining the second permission level of the second identity authentication mode.

Specifically, in a process of adding the second identity authentication mode for the electronic device corresponding to the first identity authentication mode, the second permission level of the second identity authentication mode may be set by a user corresponding to the first identity authentication mode, or may be set by a user corresponding to the second identity authentication mode, or may be determined by an attribute of the second identity authentication mode.

According to an embodiment of the present application, the first permission level is higher than the second permission level, the first permission level further has permission to manage an asset corresponding to the second character in the at least one character, and the second permission level has permission to manage the asset corresponding to the first character.

In the embodiment, the first identity authentication mode may be used to add the second identity authentication mode with a permission level lower than that of the first identity authentication mode. Before the second identity authentication mode is added, the first identity authentication mode may be a unique identity authentication mode of the digital identity, or may be one identity authentication mode in a plurality of identity authentication modes of the digital identity.

FIG. 6 is schematic flowchart of a key management method according to another exemplary embodiment of the present application. The embodiment illustrated in FIG. 6 of the present application is further obtained based on the embodiment illustrated in FIG. 5 of the present application. The following focuses on the differences between the embodiment illustrated in FIG. 6 and the embodiment illustrated in FIG. 5, and the similarities are not repeated.

In the embodiment, the first permission level is equal to the second permission level, and the first permission level further has permission to manage the asset corresponding to the second character in the at least one character. As shown in FIG. 6, the key management method further includes the following contents.

S561: decrypting, by using the first authentication decryption key, an initially encrypted second character decryption key corresponding to the first identity authentication mode to obtain a second character decryption key.

S562: encrypting the second character decryption key by using the second authentication encryption key to obtain an initially encrypted second character decryption key corresponding to the second identity authentication mode.

The second authentication decryption key is further used to decrypt the initially encrypted second character decryption key corresponding to the second identity authentication mode to obtain the second character decryption key. The second character decryption key is corresponding to the second character and used to decrypt an encrypted second target key to obtain a second target key, and the second target key is used to manage an asset corresponding to the second character.

Herein Step S561 may be performed simultaneously with Step S530, and Step S562 may be performed simultaneously with Step S540.

In the embodiment, the first identity authentication mode may be used to add a second identity authentication mode having a permission level equal to that of the first identity authentication mode.

FIG. 7 is schematic flowchart of a key management method according to another exemplary embodiment of the present application. The embodiment illustrated in FIG. 7 of the present application is further obtained based on the embodiment illustrated in FIG. 5 of the present application. The following focuses on the differences between the embodiment illustrated in FIG. 7 and the embodiment illustrated in FIG. 5, and the similarities are not repeated.

In the embodiment, before the second identity authentication mode is added, the first identity authentication mode is a unique authentication mode of the digital identity. The first permission level is lower than the second permission level, the second permission level has permission to manage an asset corresponding to the first character and an asset corresponding to a second character in the at least one character, and the first identity authentication mode having the first permission level has permission to manage the asset corresponding to the first character. As shown in FIG. 7, the key management method further includes the following contents.

S571: generating a second character decryption key.

Specifically, the second character decryption key may be generated by an electronic device, for example, generated by a client corresponding to a digital identity, or may be generated by a server side and then sent to the electronic device.

S572: encrypting the second character decryption key by using the second authentication encryption key to obtain an initially encrypted second character decryption key corresponding to the second identity authentication mode.

The second authentication decryption key is further used to decrypt the initially encrypted second character decryption key corresponding to the second identity authentication mode to obtain the second character decryption key. The second character decryption key is corresponding to the second character and used to decrypt an encrypted second target key to obtain a second target key, and the second target key is used to manage an asset corresponding to the second character.

Specifically, in some embodiments, Step S571 and Step S572 may be performed by an electronic device corresponding to the first identity authentication mode. The second character decryption key may be generated by the electronic device corresponding to the first identity authentication mode; or the second character decryption key may be generated on a server side, and the electronic device corresponding to the first identity authentication mode acquires the second character decryption key from the server side; or the second character decryption key may be generated by an electronic device corresponding to the second identity authentication mode, and the electronic device corresponding to the first identity authentication mode acquires the second character decryption key from the electronic device corresponding to the second identity authentication mode. The initially encrypted second character decryption key corresponding to the second identity authentication mode may be saved on the server side or in the electronic device corresponding to the second identity authentication mode.

In some other embodiments, at least one of Step S571 and Step S572 may be performed by the server side or the electronic device corresponding to the second identity authentication mode. The initially encrypted second character decryption key corresponding to the second identity authentication mode may be saved on the server side or in the electronic device corresponding to the second identity authentication mode.

In an embodiment, when the digital identity corresponds to a plurality of identity authentication modes, an identity authentication mode with a low permission level in the plurality of identity authentication modes cannot be used to add an identity authentication mode with a high permission level, and an identity authentication mode with a high permission level in the plurality of identity authentication modes is required to be used to add an identity authentication mode with a permission level lower than or equal to the high permission level. In the embodiment, since the first identity authentication mode is a unique identity authentication mode, during addition of an identity authentication mode with a permission level higher than that of the first identity authentication mode, a first character decryption key may be acquired through the first identity authentication mode, and then permission for acquiring the first character decryption key may be granted to the identity authentication mode with a higher permission level. In addition, a second character decryption key may be generated, and then permission for acquiring the second character decryption key may be granted to the identity authentication mode with a higher permission level.

An exemplary embodiment of the present application provides a key management method. The method may be performed by an electronic device, such as a mobile phone, and may be specifically performed by a client, on the electronic device, corresponding to a digital identity. The key management method relates to a process of changing a permission level of a third identity authentication mode by using a first identity authentication mode, specifically including: deleting an initially encrypted second character decryption key corresponding to the third identity authentication mode, to reduce the permission level of the third identity authentication mode.

The digital identity at least includes the first identity authentication mode and the third identity authentication mode. The first identity authentication mode corresponds to a first permission level in a plurality of permission levels of the digital identity, the third identity authentication mode corresponds to a third permission level in the plurality of permission levels, the third permission level is equal to or lower than the first permission level, and the third permission level has permission to manage an asset corresponding to the first character and an asset corresponding to a second character in the at least one character.

If the third identity authentication mode and the first identity authentication mode correspond to a same electronic device of a same user, the initially encrypted second character decryption key corresponding to the third identity authentication mode is saved on the electronic device and may be directly deleted through the electronic device. If the third identity authentication mode and the first identity authentication mode correspond to different users, the initially encrypted second character decryption key corresponding to the third identity authentication mode is saved on an electronic device corresponding to the third identity authentication mode and may be deleted through an instruction sent by an electronic device corresponding to the first identity authentication mode to the electronic device corresponding to the third identity authentication mode. If the initially encrypted second character decryption key corresponding to the third identity authentication mode is saved locally, the electronic device directly deletes the initially encrypted second character decryption key. If the initially encrypted second character decryption key corresponding to the third identity authentication mode is saved on a server side, the electronic device corresponding to the first identity authentication mode deletes the initially encrypted second character decryption key by sending an instruction the server side.

In the embodiment, the initially encrypted second character decryption key corresponding to the third identity authentication mode is deleted to reduce the permission level of the third identity authentication mode, which may only relate to a key corresponding to the third identity authentication mode, and has no effect on a key corresponding to another identity authentication mode. This method may be better applied to a case in which there are many identity authentication modes corresponding to the digital identity, and may quickly implement reduction of the permission level of the third identity authentication mode.

In another embodiment, the third identity authentication mode may be further removed from the digital identity by deleting an initially encrypted first character decryption key corresponding to the third identity authentication mode.

A process of deleting the initially encrypted first character decryption key corresponding to the third identity authentication mode is similar to a process of deleting the initially encrypted second character decryption key corresponding to the third identity authentication mode.

FIG. 8 is a schematic flowchart of a key management method according to another exemplary embodiment of the present application. The method illustrated in FIG. 8 may be performed by an electronic device, such as a mobile phone, and specifically may be performed by a client, on the electronic device, corresponding to a digital identity. As shown in FIG. 8, the key management method relates to a process of changing a permission level of a third identity authentication mode by using a first identity authentication mode, and specifically includes the following contents.

S810: generating a new second character decryption key.

S820: encrypting the new second character decryption key by using a first authentication encryption key corresponding to a first authentication decryption key to obtain a new initially encrypted second character decryption key corresponding to the first identity authentication mode, to reduce a permission level of the third identity authentication mode.

The digital identity at least includes the first identity authentication mode and the third identity authentication mode. The first identity authentication mode corresponds to a first permission level in a plurality of permission levels of the digital identity, the third identity authentication mode corresponds to a third permission level in the plurality of permission levels, the third permission level is equal to or lower than the first permission level, and the third permission level has permission to manage an asset corresponding to the first character and an asset corresponding to a second character in the at least one character.

The first authentication decryption key is used to decrypt the new initially encrypted second character decryption key corresponding to the first identity authentication mode to obtain a new second character decryption key. The new second character decryption key is corresponding to the second character and used to decrypt an encrypted second target key to obtain a second target key, and the second target key is used to manage the asset corresponding to the second character.

In the embodiment, the permission level of the third identity authentication mode is reduced by generating a new character decryption key, which may not relate to a key corresponding to the third identity authentication mode. This method may be better applied to a case in which there are few identity authentication modes corresponding to the digital identity, and an interaction between two identity authentication modes may be avoided, so that reduction of the permission level of the third identity authentication mode may be quickly implemented.

In an embodiment, a new second character encryption key may further be generated during generation of the new second character decryption key.

In an embodiment, a new first character decryption key may be further generated, and the first authentication encryption key corresponding to the first authentication decryption key may be used to encrypt the new first character decryption key, to obtain a new initially encrypted first character decryption key corresponding to the first identity authentication mode, so as to remove the third identity authentication mode from the digital identity.

FIG. 9 is a schematic flowchart of a key management method according to another exemplary embodiment of the present application. The method illustrated in FIG. 9 may be performed by an electronic device, such as a mobile phone, and specifically may be performed by a client, on the electronic device, corresponding to a digital identity. As shown in FIG. 9, the key management method relates to a process of changing a permission level of a third identity authentication mode by using a first identity authentication mode, and specifically includes the following contents.

S910: acquiring a third authentication encryption key corresponding to the third identity authentication mode.

For a generation and acquisition process of the third authentication encryption key, reference may be made to the generation and acquisition process of the second authentication encryption key in the embodiment illustrated in FIG. 5. To avoid repetition, details are not repeated herein again.

S920: decrypting, by using the first authentication decryption key, an initially encrypted second character decryption key corresponding to the first identity authentication mode to obtain a second character decryption key.

S930: encrypting the second character decryption key by using the third authentication encryption key to obtain an initially encrypted second character decryption key corresponding to the third identity authentication mode, to increase a permission level of the third identity authentication mode.

The digital identity at least includes the first identity authentication mode and the third identity authentication mode. The first identity authentication mode corresponds to a first permission level in a plurality of permission levels of the digital identity, and the third identity authentication mode corresponds to a third permission level in the plurality of permission levels. The third permission level is lower than the first permission level, the first permission level has permission to manage an asset corresponding to the first character and an asset corresponding to a second character in the at least one character, and the third permission level has permission to manage the asset corresponding to the first character.

A third authentication decryption key is corresponding to the third authentication encryption key and used to decrypt the initially encrypted second character decryption key corresponding to the third identity authentication mode to obtain the second character decryption key. The second character decryption key is corresponding to the second character and used to decrypt an encrypted second target key to obtain a second target key, and the second target key is used to manage the asset corresponding to the second character.

In the embodiment, the permission level of the third identity authentication mode is improved by using the first identity authentication mode, so that management of all assets under the digital identity may be more flexible for each identity authentication mode.

Exemplary Apparatus

FIG. 10 is schematic structural diagram of a key management apparatus 1000 according to an exemplary embodiment of the present application. As shown in FIG. 10, the apparatus 1000 includes a first acquisition module 1010 and a first encryption module 1020.

The first acquisition module 1010 is configured to acquire authorization of a user through a first identity authentication mode to generate a first authentication encryption key, where the first identity authentication mode is used for logging into a digital identity. The first encryption module 1020 is configured to encrypt at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key.

According to the key management apparatus provided in the embodiments of the present application, a first authentication encryption key corresponding to a first identity authentication mode is generated, and at least one character decryption key of a digital identity is encrypted by using the first authentication encryption key, where the at least one character decryption key is used to decrypt an encrypted target key to obtain at least one target key, so that an identity authentication mode can be associated with a target key, facilitating a management and use process of the target key.

According to an embodiment of the present application, the apparatus 1000 further includes: a first generation module 1030, configured to generate a third storage key based on identity authentication information corresponding to the first identity authentication mode, and generate a first authentication decryption key corresponding to the first authentication encryption key; and a second encryption module 1040, configured to encrypt the first authentication decryption key by using the third storage key to obtain an encrypted first authentication decryption key.

According to an embodiment of the present application, the identity authentication information is non-public identity authentication information, and the first generation module 1030 is configured to generate the third storage key based on the non-public identity authentication information and a parent name of a user corresponding to the first identity authentication mode.

According to an embodiment of the present application, the apparatus 1000 further includes: a sending module 1050, configured to submit the encrypted first authentication decryption key to a server side and submit the at least one initially encrypted character decryption key submitted to the server side.

According to an embodiment of the present application, the apparatus 1000 further includes: a third encryption module 1060, configured to separately encrypt the at least one target key by using at least one character encryption key to obtain the at least one encrypted target key.

According to an embodiment of the present application, the apparatus 1000 further includes: a storage module 1070, configured to save the at least one encrypted target key locally.

According to an embodiment of the present application, the apparatus 1000 further includes: a second generation module 1080, configured to randomly generate at least one character decryption key.

It should be understood that, for operations and functions of the first acquisition module 1010, the first encryption module 1020, the first generation module 1030, the second encryption module 1040, the sending module 1050, the third encryption module 1060, the storage module 1070, and the second generation module 1080 in the foregoing embodiments, reference may be made to the description in the key management method in the embodiments illustrated in FIG. 2 to FIG. 4. Details are not described herein again to avoid repetition.

Figure 11:
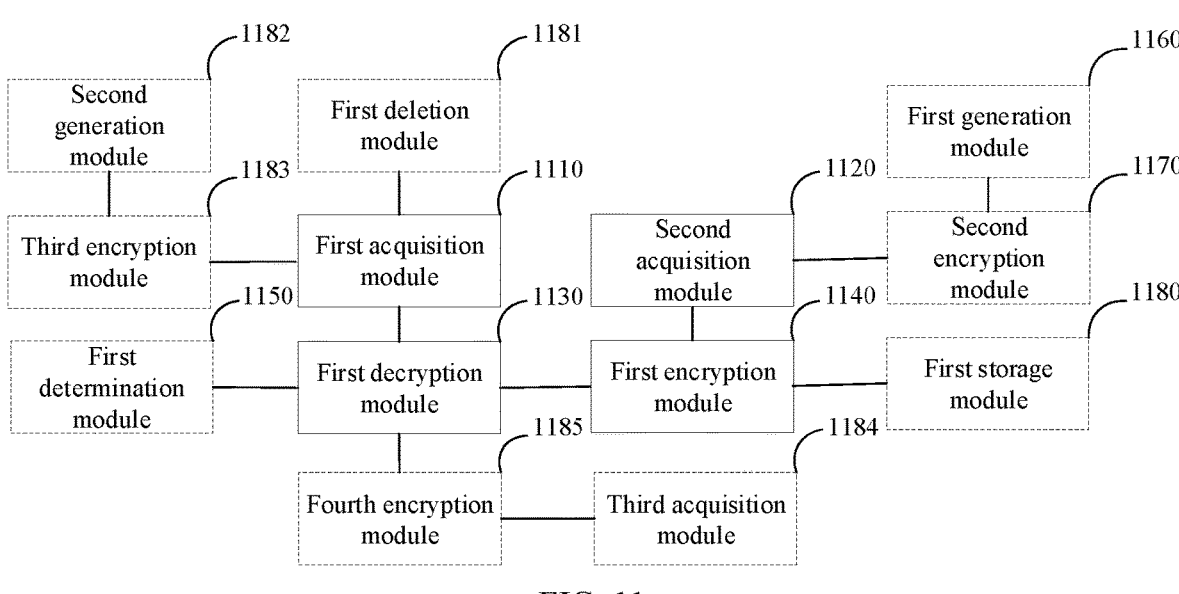
FIG. 11 is a schematic structural diagram of a key management apparatus according to another exemplary embodiment of the present application.

FIG. 11 is schematic structural diagram of a key management apparatus 1100 according to another exemplary embodiment of the present application. As shown in FIG. 11, the apparatus 1100 includes: a first acquisition module 1110, a second acquisition module 1120, a first decryption module 1130, and a first encryption module 1140.

The first acquisition module 1110 is configured to acquire a first authentication decryption key corresponding to a first identity authentication mode of a digital identity. The second acquisition module 1120 is configured to acquire a second authentication encryption key corresponding to a second identity authentication mode that is to be added to the digital identity. The first decryption module 1130 is configured to decrypt, by using the first authentication decryption key, an initially encrypted first character decryption key corresponding to the first identity authentication mode to obtain a first character decryption key. The first encryption module 1140 is configured to encrypt the first character decryption key by using the second authentication encryption key to obtain an initially encrypted first character decryption key corresponding to the second identity authentication mode, where the first character decryption key is corresponding to a first character in at least one character of the digital identity and used to decrypt an encrypted first target key to obtain a first target key.

According to the key management apparatus provided in the embodiments of the present application, the second identity authentication mode is added for the digital identity through the first identity authentication mode, so that classified management of keys may be implemented, and diversity of a key management process may be implemented.

According to an embodiment of the present application, the first identity authentication mode corresponds to a first permission level in a plurality of permission levels of the digital identity, the second identity authentication mode corresponds to a second permission level in the plurality of permission levels, and the first permission level has permission to manage an asset corresponding to the first character. The apparatus 1100 further includes a first determination module 1150, configured to determine the second permission level of the second identity authentication mode before the first decryption module 1130 decrypts, by using the first authentication decryption key, an initially encrypted first character decryption key corresponding to the first identity authentication mode.

According to an embodiment of the present application, the first permission level is higher than the second permission level, the first permission level further has permission to manage an asset corresponding to the second character in the at least one character, and the second permission level has permission to manage the asset corresponding to the first character.

According to an embodiment of the present application, the first permission level is equal to the second permission level, and the first permission level further has permission to manage an asset corresponding to the second character in the at least one character. The first decryption module 1130 is further configured to decrypt, by using the first authentication decryption key, an initially encrypted second character decryption key corresponding to the first identity authentication mode to obtain a second character decryption key. The first encryption module 1140 is further configured to encrypt the second character decryption key by using the second authentication encryption key to obtain an initially encrypted second character decryption key corresponding to the second identity authentication mode. The second character decryption key is corresponding to the second character and used to decrypt an encrypted second target key to obtain a second target key, the first target key is used to manage the asset corresponding to the first character, and the second target key is used to manage the asset corresponding to the second character.

According to an embodiment of the present application, the first permission level is lower than the second permission level, and the second permission level has permission to manage the asset corresponding to the first character and an asset corresponding to a second character in the at least one character. The apparatus 1100 further includes: a first generation module 1160, configured to generate a second character decryption key; and a second encryption module 1170, configured to encrypt the second character decryption key by using the second authentication encryption key to obtain an initially encrypted second character decryption key corresponding to the second identity authentication mode. The second character decryption key is corresponding to the second character and used to decrypt an encrypted second target key to obtain a second target key, the first target key is used to manage the asset corresponding to the first character, and the second target key is used to manage the asset corresponding to the second character.

According to an embodiment of the present application, the apparatus 1100 further includes a first storage module 1180, configured to save the initially encrypted first character decryption key corresponding to the second identity authentication mode to a server side or a client corresponding to the second identity authentication mode.

According to an embodiment of the present application, the digital identity further includes a third identity authentication mode, the first identity authentication mode corresponds to a first permission level in a plurality of permission levels of the digital identity, the third identity authentication mode corresponds to a third permission level in the plurality of permission levels, the third permission level is equal to or lower than the first permission level, and the third permission level has permission to manage an asset corresponding to the first character and an asset corresponding to a second character in the at least one character. The apparatus 1100 further includes a first deletion module 1181, configured to delete an initially encrypted second character decryption key corresponding to the third identity authentication mode, to reduce the permission level of the third identity authentication mode.

According to an embodiment of the present application, the first deletion module 1181 is further configured to delete an initially encrypted first character decryption key corresponding to the third identity authentication mode, so as to remove the third identity authentication mode from the digital identity.

According to an embodiment of the present application, the digital identity further includes a third identity authentication mode, the first identity authentication mode corresponds to a first permission level in a plurality of permission levels of the digital identity, the third identity authentication mode corresponds to a third permission level in the plurality of permission levels, the third permission level is equal to or lower than the first permission level, and the third permission level has permission to manage an asset corresponding to the first character and an asset corresponding to a second character in the at least one character. The apparatus 1100 further includes: a second generation module 1182, configured to generate a new second character decryption key; and a third encryption module 1183, configured to encrypt the new second character decryption key by using a first authentication encryption key corresponding to the first authentication decryption key to obtain a new initially encrypted second character decryption key corresponding to the first identity authentication mode, to reduce a permission level of the third identity authentication mode. The new second character decryption key is corresponding to the second character and used to decrypt an encrypted second target key to obtain a second target key, the first target key is used to manage the asset corresponding to the first character, and the second target key is used to manage the asset corresponding to the second character.

According to an embodiment of the present application, the second generation module 1182 is further configured to generate a new first character decryption key; and the third encryption module 1183 is further configured to encrypt the new first character decryption key by using the first authentication encryption key corresponding to the first authentication decryption key, to obtain a new initially encrypted first character decryption key corresponding to the first identity authentication mode, so as to remove the third identity authentication mode from the digital identity.

According to an embodiment of the present application, the digital identity further includes a third identity authentication mode, the first identity authentication mode corresponds to a first permission level in a plurality of permission levels of the digital identity, the third identity authentication mode corresponds to a third permission level in the plurality of permission levels, the third permission level is lower than the first permission level, the first permission level has permission to manage an asset corresponding to the first character and an asset corresponding to a second character in the at least one character, and the third permission level has permission to manage the asset corresponding to the first character. The apparatus 1100 further includes: a third acquisition module 1184, configured to acquire a third authentication encryption key corresponding to the third identity authentication mode, where the first decryption module 1130 is further configured to decrypt, by using the first authentication decryption key, an initially encrypted second character decryption key corresponding to the first identity authentication mode to obtain a second character decryption key; and a fourth encryption module 1185, configured to encrypt the second character decryption key by using the third authentication encryption key to obtain an initially encrypted second character decryption key corresponding to the third identity authentication mode, to increase a permission level of the third identity authentication mode. The second character decryption key is corresponding to the second character and used to decrypt an encrypted second target key to obtain a second target key, the first target key is used to manage the asset corresponding to the first character, and the second target key is used to manage the asset corresponding to the second character.

It should be understood that, for operations and functions of the first acquisition module 1110, the second acquisition module 1120, the first decryption module 1130, the first encryption module 1140, the first determination module 1150, the first generation module 1160, the second encryption module 1170, the first storage module 1180, the first deletion module 1181, the second generation module 1182, the third encryption module 1183, the third acquisition module 1184, and the fourth encryption module 1185 in the foregoing embodiments, reference may be made to the description in the key management method provided in the embodiments illustrated in FIG. 5 to FIG. 9. Details are not described herein again to avoid repetition.

Figure 12:
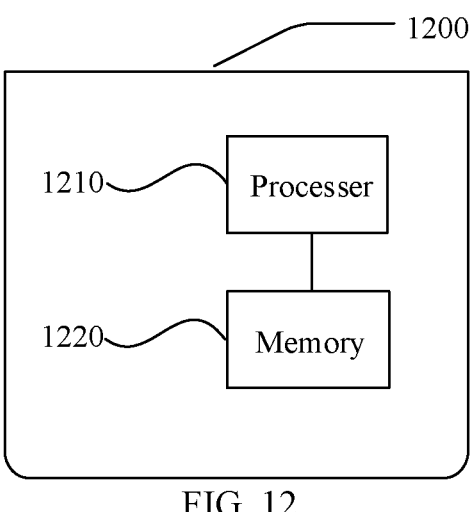
FIG. 12 is a block diagram of an electronic device for key management according to an exemplary embodiment of the present application.

FIG. 12 is a block diagram of an electronic device 1200 for key management according to an exemplary embodiment of the present application.

Referring to FIG. 12, an electronic device 1200 includes a processor 1210, and a memory resource represented by a memory 1220 for storing instructions executable by the processor 1210, such as an application program. The application program stored in the memory 1220 may include one or more modules each corresponding to a set of instructions. In addition, the processor 1210 is configured to execute instructions to perform the foregoing key management method.

The electronic device 1200 may further include: a power supply component, configured to perform power management of the electronic device 1200; a wired or wireless network interface, configured to connect the electronic device 1200 to a network; and an input/output (I/O) interface. The electronic device 1200 may be operated based on an operating system stored in the memory 1220, such as Windows Server™, Mac OS X™, Unix™, Linux™, and FreeBSD™.

A non-transitory computer-readable storage medium is provided, and when instructions in the storage medium are executed by the processor of the electronic device 1200, the electronic device 1200 can perform a key management method. The key management method includes: acquiring authorization of a user through a first identity authentication mode to generate a first authentication encryption key, where the first identity authentication mode is used for logging into a digital identity; and encrypting at least one character decryption key by using the first authentication encryption key to obtain at least one initially encrypted character decryption key corresponding to the first identity authentication mode, where the at least one character decryption key is in a one-to-one correspondence with at least one character of the digital identity and used to decrypt at least one encrypted target key to obtain at least one target key. Alternatively, the key management method includes: acquiring a first authentication decryption key corresponding to a first identity authentication mode of a digital identity; acquiring a second authentication encryption key corresponding to a second identity authentication mode that is to be added to the digital identity; decrypting, by using the first authentication decryption key, an initially encrypted first character decryption key corresponding to the first identity authentication mode to obtain a first character decryption key; and encrypting the first character decryption key by using the second authentication encryption key to obtain an initially encrypted first character decryption key corresponding to the second identity authentication mode, where the first character decryption key is corresponding to a first character in at least one character of the digital identity and used to decrypt an encrypted first target key to obtain a first target key.

All of the foregoing optional technical solutions may be used in any combination to form an optional embodiment of the present application, and will not be further described herein.

Persons of ordinary skill in the art may be aware that, units and algorithm steps in examples described in combination with the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, functional units in the embodiments of the present application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such understanding, the technical solution of the present application, which is essential or a part contributing to the prior art or a part, of the technical solution, may be embodied in the form of a software product. The computer software product is stored in a storage medium and includes a plurality of instructions for enabling a computer device (which may be a personal computer, a server, a network device, or the like) to execute all or some steps of the method according to each embodiment of the present application. The foregoing storage medium includes: various media that may store program check codes, such as a USB flash disk, a mobile hard disk, Read-Only Memory (ROM), a Random Access Memory (RAM), a magnetic disk, or an optical disk.

It should be noted that, in the description of the present application, the terms "first", "second", "third", and the like are merely intended for a purpose of description, and shall not be understood as an indication or implication of relative importance. In addition, in the descriptions of the present application, unless otherwise stated, "a plurality of" means at least two.

The foregoing descriptions are merely preferred embodiments of the present application and not intended to limit the present application. Any modifications, equivalent replacements or the like made without departing from the spirit and principle of the present application shall be included within the protection scope of the present application.

What is claimed is:

1. A key management method, comprising:

acquiring, by a client device under control of a user, authorization of the user through a first identity authentication mode to generate a first authentication encryption key, wherein the first identity authentication mode is used for logging into a digital identity of the user; and encrypting at least one character decryption key by using the first authentication encryption key to obtain at least one initially encrypted character decryption key corresponding to the first identity authentication mode, wherein the at least one character decryption key is in a one-to-one correspondence with at least one character of the digital identity and used to decrypt at least one encrypted target key to obtain at least one target key, and the first authentication encryption key and the at least one character decryption key are generated and managed under control of the user for accessing the digital identity.

2. The key management method according to claim 1, further comprising:

generating a third storage key based on identity authentication information corresponding to the first identity authentication mode;

generating a first authentication decryption key corresponding to the first authentication encryption key; and encrypting the first authentication decryption key by using the third storage key to obtain an encrypted first authentication decryption key.

3. The key management method according to claim 2, wherein the identity authentication information is non-public identity authentication information, and the generating a third storage key based on identity authentication information corresponding to the first identity authentication mode comprises:

generating the third storage key based on the non-public identity authentication information and a parent name of a user corresponding to the first identity authentication mode.

4. The key management method according to claim 2, further comprising:

submitting the encrypted first authentication decryption key to a server side; and submitting the at least one initially encrypted character decryption key to the server side.

5. The key management method according to claim 2, further comprising:

separately encrypting the at least one target key by using at least one character encryption key to obtain the at least one encrypted target key.

6. The key management method according to claim 5, further comprising:

saving the at least one encrypted target key locally.

7. The key management method according to claim 1, further comprising:

randomly generating the at least one character decryption key.

8. The key management method according to claim 1, further comprising:

acquiring a first authentication decryption key corresponding to the first identity authentication mode of the digital identity;

acquiring a second authentication encryption key corresponding to a second identity authentication mode that is to be added to the digital identity;

decrypting, by using the first authentication decryption key, an initially encrypted first character decryption key corresponding to the first identity authentication mode to obtain a first character decryption key; and encrypting the first character decryption key by using the second authentication encryption key to obtain an initially encrypted first character decryption key corresponding to the second identity authentication mode, wherein the first character decryption key is corresponding to a first character in the at least one character of the digital identity and used to decrypt an encrypted first target key to obtain a first target key.

9. The key management method according to claim 8, wherein the first identity authentication mode corresponds to a first permission level in a plurality of permission levels of the digital identity, the second identity authentication mode corresponds to a second permission level in the plurality of permission levels, and the first permission level has permission to manage an asset corresponding to the first character, wherein before the decrypting, by using the first authentication decryption key, an initially encrypted first character decryption key corresponding to the first identity authentication mode, the key management method further comprises:

determining the second permission level of the second identity authentication mode.

10. A key management method, comprising:

acquiring a first authentication decryption key corresponding to a first identity authentication mode of a digital identity;

acquiring a second authentication encryption key corresponding to a second identity authentication mode that is to be added to the digital identity;

decrypting, by using the first authentication decryption key, an initially encrypted first character decryption key corresponding to the first identity authentication mode to obtain a first character decryption key; and encrypting the first character decryption key by using the second authentication encryption key to obtain an initially encrypted first character decryption key corresponding to the second identity authentication mode, wherein the first character decryption key is corresponding to a first character in at least one character of the digital identity and used to decrypt an encrypted first target key to obtain a first target key.

11. The key management method according to claim 10, wherein the first identity authentication mode corresponds to a first permission level in a plurality of permission levels of the digital identity, the second identity authentication mode corresponds to a second permission level in the plurality of permission levels, and the first permission level has permission to manage an asset corresponding to the first character, wherein before the decrypting, by using the first authentication decryption key, an initially encrypted first character decryption key corresponding to the first identity authentication mode, the key management method further comprises:

determining the second permission level of the second identity authentication mode.

12. The key management method according to claim 11, wherein the first permission level is higher than the second permission level, the first permission level further has permission to manage an asset corresponding to a second character in the at least one character, and the second permission level has permission to manage the asset corresponding to the first character.

13. The key management method according to claim 11, wherein the first permission level is equal to the second permission level, the first permission level further has permission to manage an asset corresponding to a second character in the at least one character, and the key management method further comprises:

decrypting, by using the first authentication decryption key, an initially encrypted second character decryption key corresponding to the first identity authentication mode to obtain a second character decryption key; and encrypting the second character decryption key by using the second authentication encryption key to obtain an initially encrypted second character decryption key corresponding to the second identity authentication mode, wherein the second character decryption key is corresponding to the second character and used to decrypt an encrypted second target key to obtain a second target key, the first target key is used to manage the asset corresponding to the first character, and the second target key is used to manage the asset corresponding to the second character.

14. The key management method according to claim 11, wherein the first permission level is lower than the second permission level, the second permission level has permission to manage the asset corresponding to the first character and an asset corresponding to a second character in the at least one character, and the key management method further comprises:

generating a second character decryption key; and encrypting the second character decryption key by using the second authentication encryption key to obtain an initially encrypted second character decryption key corresponding to the second identity authentication mode, wherein the second character decryption key is corresponding to the second character and used to decrypt an encrypted second target key to obtain a second target key, the first target key is used to manage the asset corresponding to the first character, and the second target key is used to manage the asset corresponding to the second character.

15. The key management method according to claim 10, wherein the digital identity further comprises a third identity authentication mode, the first identity authentication mode corresponds to a first permission level in a plurality of permission levels of the digital identity, the third identity authentication mode corresponds to a third permission level in the plurality of permission levels, the third permission level is equal to or lower than the first permission level, and the third permission level has permission to manage an asset corresponding to the first character and an asset corresponding to a second character in the at least one character, wherein the key management method further comprises:

deleting an initially encrypted second character decryption key corresponding to the third identity authentication mode to reduce a permission level of the third identity authentication mode; or wherein the key management method further comprises:

generating a new second character decryption key; and encrypting the new second character decryption key by using a first authentication encryption key corresponding to the first authentication decryption key to obtain a new initially encrypted second character decryption key corresponding to the first identity authentication mode, to reduce a permission level of the third identity authentication mode, wherein the new second character decryption key is corresponding to the second character and used to decrypt an encrypted second target key to obtain a second target key, the first target key is used to manage the asset corresponding to the first character, and the second target key is used to manage the asset corresponding to the second character.

16. The key management method according to claim 10, wherein the digital identity further comprises a third identity authentication mode, the first identity authentication mode corresponds to a first permission level in a plurality of permission levels of the digital identity, the third identity authentication mode corresponds to a third permission level in the plurality of permission levels, the third permission level is lower than the first permission level, the first permission level has permission to manage an asset corresponding to the first character and an asset corresponding to a second character in the at least one character, the third permission level has permission to manage the asset corresponding to the first character, and the key management method further comprises:

acquiring a third authentication encryption key corresponding to the third identity authentication mode;

decrypting, by using the first authentication decryption key, an initially encrypted second character decryption key corresponding to the first identity authentication mode to obtain a second character decryption key; and encrypting the second character decryption key by using the third authentication encryption key to obtain an initially encrypted second character decryption key corresponding to the third identity authentication mode, to increase a permission level of the third identity authentication mode, wherein the second character decryption key is corresponding to the second character and used to decrypt an encrypted second target key to obtain a second target key, the first target key is used to manage the asset corresponding to the first character, and the second target key is used to manage the asset corresponding to the second character.

17. An electronic device, comprising:

a processor; and a memory, wherein the memory is configured to store instructions executable by the processor, and the instructions, when executed by the processor, cause the processor to perform the key management method according to claim 1.

18. An electronic device, comprising:

a processor; and a memory, wherein the memory is configured to store instructions executable by the processor, and the instructions, when executed by the processor, cause the processor to perform the key management method according to claim 10.

19. A non-transitory computer-readable storage medium, comprising computer instructions stored thereon, wherein the computer instructions, when executed by a processor, cause the processor to perform the key management method according to claim 1.

20. A non-transitory computer-readable storage medium, comprising computer instructions stored thereon, wherein the computer instructions, when executed by a processor, cause the processor to perform the key management method according to claim 10.

* * * * *